United States Patent
Goslin

(10) Patent No.: US 11,210,826 B2
(45) Date of Patent: Dec. 28, 2021

(54) SYSTEMS AND METHODS TO PROVIDE ARTIFICIAL INTELLIGENCE EXPERIENCES

(71) Applicant: Disney Enterprises, Inc., Burbank, CA (US)

(72) Inventor: Michael P. Goslin, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 280 days.

(21) Appl. No.: 15/887,120

(22) Filed: Feb. 2, 2018

(65) Prior Publication Data

US 2019/0244404 A1 Aug. 8, 2019

(51) Int. Cl.
*G06N 3/00* (2006.01)
*G06T 11/60* (2006.01)

(52) U.S. Cl.
CPC .............. *G06T 11/60* (2013.01); *G06N 3/006* (2013.01)

(58) Field of Classification Search
CPC .......... G06T 11/60; G06N 3/006; H04L 67/12
See application file for complete search history.

(56) References Cited

U.S. PATENT DOCUMENTS

| 8,643,676 | B2 | 2/2014 | Matsui | |
|---|---|---|---|---|
| 8,825,087 | B2 | 9/2014 | Hamill | |
| 8,963,805 | B2 | 2/2015 | Sugden | |
| 9,035,970 | B2 | 5/2015 | Lamb | |
| 2006/0105838 | A1* | 5/2006 | Mullen | A63F 13/25 463/31 |
| 2008/0091692 | A1* | 4/2008 | Keith | G06F 16/958 |
| 2008/0263460 | A1* | 10/2008 | Altberg | G06Q 30/02 715/757 |
| 2009/0033588 | A1 | 2/2009 | Kajita | |
| 2009/0241126 | A1* | 9/2009 | Beggs, Jr. | G06F 3/011 719/318 |
| 2010/0103196 | A1 | 4/2010 | Kumar | |

(Continued)

OTHER PUBLICATIONS

"Mastering Pokemon Go: Pokemon Go Raid Battles: How to find 'em, fight 'em, and win!", Rene Ritchie, Jul. 29, 2017, available at https://web.archive.org/web/20170805145402/https://www.imore.com/pokemon-go-raids, hereinafter "Pokemon" (Year: 2017).*

(Continued)

*Primary Examiner* — Yongjia Pan
(74) *Attorney, Agent, or Firm* — Esplin & Associates, PC

(57) ABSTRACT

The present disclosure relates to providing artificial intelligence experiences. The artificial intelligence experiences may include a persistent virtual character. The artificial intelligence experiences are presented through an augmented reality system. The persistent virtual characters are associated with geo-locations. The persistent virtual characters are accessible to the user at the geolocation associated with the persistent virtual characters. A system managing the persistent virtual characters is continuously updated based on user interaction with the persistent virtual characters and information received from external sources. The persistent virtual characters manner of behavior toward the user is based on previous user interaction with the persistent virtual characters and information received from external sources.

20 Claims, 4 Drawing Sheets

(56) References Cited

U.S. PATENT DOCUMENTS

| | | | |
|---|---|---|---|
| 2010/0115426 A1* | 5/2010 | Liu | G06Q 10/107 |
| | | | 715/757 |
| 2010/0253700 A1 | 10/2010 | Bergeron | |
| 2011/0242134 A1* | 10/2011 | Miller | G06T 19/006 |
| | | | 345/633 |
| 2011/0310120 A1 | 12/2011 | Narayanan | |
| 2012/0015730 A1* | 1/2012 | Watkins, Jr. | A63F 13/216 |
| | | | 463/36 |
| 2012/0025976 A1 | 2/2012 | Richey | |
| 2013/0125027 A1 | 5/2013 | Abovitz | |
| 2013/0174213 A1 | 7/2013 | Liu | |
| 2013/0293584 A1* | 11/2013 | Anderson | G06T 11/00 |
| | | | 345/633 |
| 2013/0335405 A1 | 12/2013 | Scavezze | |
| 2014/0058825 A1 | 2/2014 | Raman | |
| 2015/0032823 A1 | 1/2015 | Miller | |
| 2015/0109338 A1 | 4/2015 | Mckinnon | |
| 2015/0138234 A1 | 5/2015 | Yoon | |
| 2015/0206350 A1 | 7/2015 | Gardes | |
| 2015/0268717 A1 | 9/2015 | Schlumberger | |
| 2015/0348329 A1 | 12/2015 | Carre | |
| 2016/0125635 A1* | 5/2016 | Nam | G06T 13/40 |
| | | | 715/781 |
| 2018/0113587 A1* | 4/2018 | Allen | H04L 51/08 |
| 2018/0124148 A1* | 5/2018 | Boudville | H04L 67/02 |
| 2019/0060766 A1* | 2/2019 | Perry | A63F 13/67 |

OTHER PUBLICATIONS

Nadia, et al, "Virtual Worlds and Augmented Reality in Cultural Heritage Applications" Retreived from: http://citeseerx.ist.psu.edu/viewdoc/download?doi=10.1.1.106.9743&rep=rep1&type=pdf dated Oct. 13, 2015 (11 pages).

* cited by examiner

SYSTEMS AND METHODS TO PROVIDE ARTIFICIAL INTELLIGENCE EXPERIENCES

FIELD OF THE DISCLOSURE

The present disclosure relates to providing artificial intelligence experiences.

BACKGROUND

Virtual assistants based on artificial intelligence technology is growing in popularity. They can be seen implemented in smartphones, personal computers, and game consoles. Virtual assistants are personalized for individual users. They appear to understand their users and attempt to interact with the users in a relatable manner.

SUMMARY

One aspect of this disclosure relates to providing a user with persistent virtual entities across multiple client computing devices of the user and/or other users. The virtual character may be associated with a geo-location, and/or may be accessed at the associated geo-location. A system managing the virtual entity may save information relating to the interaction between the user and the virtual entity. The virtual entity may interact with the user in the future based on the saved information relating to the interaction. The system managing the virtual entity may obtain information about the user from external sources when the user is not interacting with the virtual entity. The virtual entity may interact with the user based on the obtained information. For example, the system managing the virtual entity at an attraction may obtain information associated with the user when the user is not at the attraction. The obtained information may be related to the user's visit to a history museum. When the user interacts with the virtual entity at the attraction, the virtual entity may ask the user about their visit to the history museum. The virtual entities may be presented through an augmented reality system. The augmented reality system may include a smartphone, a head-mounted display, and/or other computing platforms that can facilitate the presentation of the augmented reality and interactions with virtual content within the augmented reality. The virtual entity may be presented to one or more client computing device(s) associated with the user.

A system for providing a user with artificial intelligence experiences may include one or more servers, one or more client computing devices, one or more external resources, and/or other components. The one or more servers may be configured to communicate with the one or more client computing devices according to a client/server architecture. The users of the system may access the system via the client computing device(s). The server(s) may be configured to execute one or more computer program components. The computer program components may include one or more of a virtual content component, a determination component, a presentation component, an update component, and/or other components.

In some implementations, the virtual content component may be configured to obtain requests for virtual content from the client computing device(s) and/or other entities. The requests may include requests to access the virtual content through the client computing device(s). The request for access to virtual content may include a request to access the virtual entities associated with the virtual content, and/or other information.

In some implementations, the virtual content component may be configured to obtain client information from the client computing device(s). In some implementations, the client information may include one or more of sensor information, user information, client device information, and/or other information from the client computer platform(s). The sensor information may be information captured by one or more sensors associated with the client computing device(s). The user information may identify the user of the client computing device(s). The client device information may identify the client computing device(s). In some implementations, the sensor information may include the client computing device's geo-location. In some implementations, the client information may be obtained along with requests for virtual content from the client computing device(s).

In some implementations, the virtual content component may be configured to obtain third-party information associated with the user of the client computing device(s) from one or more of a third-party device, third-party servers, and/or other external resources. The third-party information may define the user's interaction outside of the system.

In some implementations, the determination component may be configured to determine the virtual content to provide to the client computing device(s). In some implementations, access to specific virtual content may be provided to a specific user, specific client computing device(s), and/or other devices. In some implementations, access to specific virtual content may be provided at specific geo-locations, and/or other locations. In some implementations, the determination component may determine the virtual content to provide to the client computing device(s) based on the geo-location of the client device(s), the user information, the client device information, and/or other information.

In some implementations, the determination component may be configured to determine the virtual entity to provide to the client computing device(s). In some implementations, access to a specific virtual entity may be provided to a specific user, specific client computing device(s), and/or other devices. In some implementations, access to the specific virtual entity may be provided at specific geo-locations, and/or other locations. In some implementations, the determination component may determine the virtual content to provide to the client computing device(s) based on the geo-location of the client device(s), the user information, the client device information, and/or other information.

In some implementations, a repository may be configured to store virtual content information, virtual content configuration information, and virtual content history information associated with given virtual content. The virtual content information may define one or more of one or more virtual entities associated with the given virtual content, a manner of interaction of a virtual entity, visual and/or audio content of the given virtual content, and/or other information of the given virtual content. The virtual content configuration information may define the associations between the given virtual content and a geo-location, the association between the virtual entity and the geo-location, and/or other information.

In some implementations, the presentation component may be configured to facilitate a presentation of the virtual content through the client computing device(s). The presentation component may facilitate the presentation of the virtual content by transmitting information that facilitates the presentation of the virtual content through the client computing device(s).

In some implementations, the presentation component may be configured to facilitate interactions between the virtual content and the user. In some implementations, the presentation component may facilitate interactions between the virtual entity and the user through the client computing device(s). In some implementations, the virtual entity may communicate with the user through the client computing device(s) via a client interface. The user may communicate with the virtual entity by inputting the user input through the client computing device(s). In some implementations, the presentation component may facilitate one or more of a response, reaction, communication, and/or other interactions from the virtual entity based on the user input.

In some implementations, the update component may be configured to manage one or more of the virtual content information, virtual content configuration information, virtual content history information, and/or other information. The update component may update and/or modify the virtual content information, the virtual content configuration information, the virtual content history information, and/or other information based on the user's interaction with the virtual entity, the third-party information, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1:
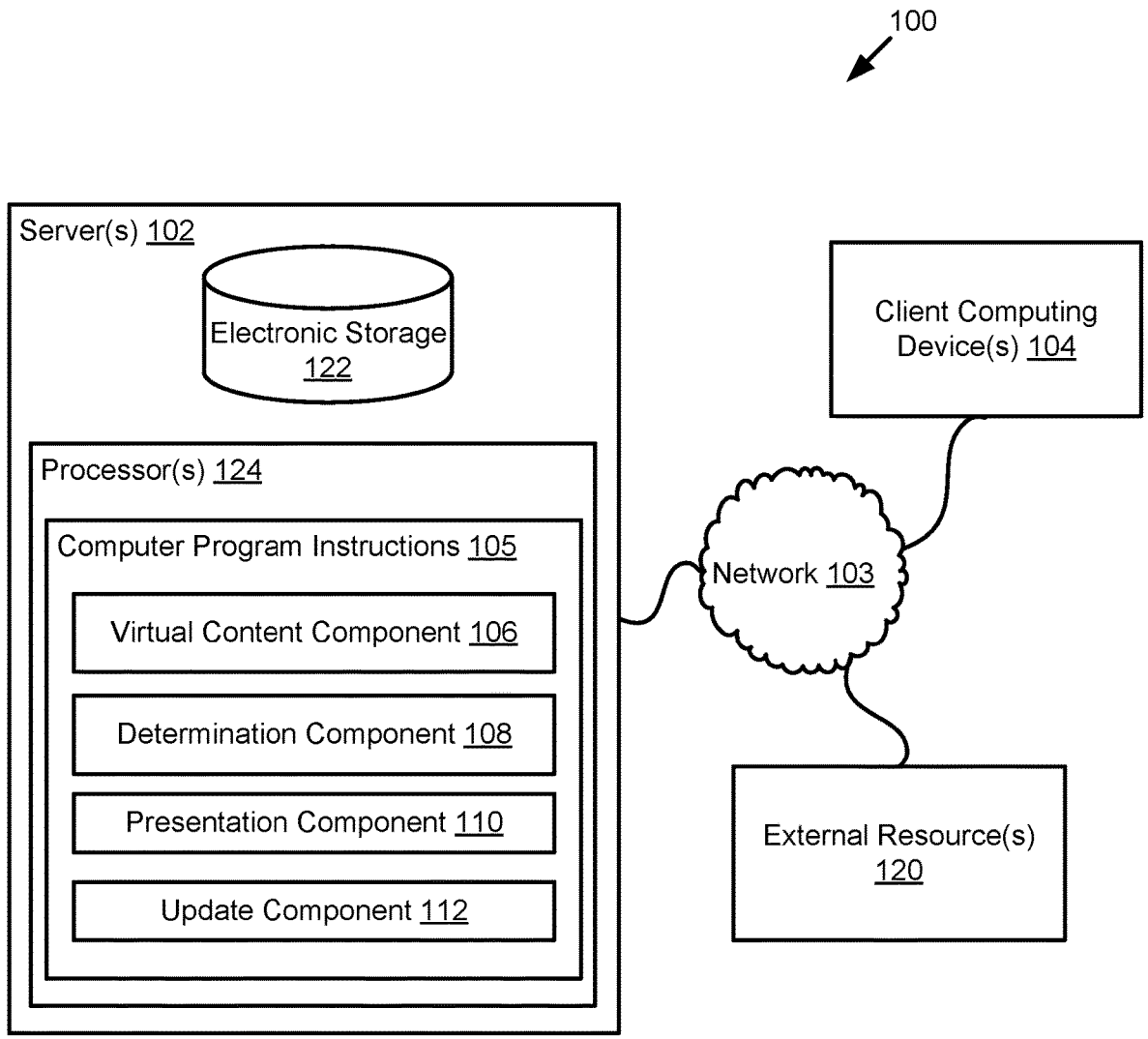
FIG. 1 illustrates a system to provide a user with an artificial intelligence experience, in accordance with one or more implementations.

FIG. 1 illustrates a system 100 for providing a user with an artificial intelligence experience, in accordance with one or more implementations. The artificial intelligence experience may include a persistent virtual entity. The persistent virtual entity may interact with the user in an augmented reality. The persistent virtual entity may be presented to the user in a real-world environment such that the persistent virtual entity appears to reside in the real-world environment from the point of view of the user. The persistent virtual entity may interact with the user based on determinations made by system 100.

As is illustrated in FIG. 1, system 100 may include one or more of one or more servers 102, one or more client computing devices 104, and/or other components. Server(s) 102 may be configured to communicate with client computing device(s) 104 according to a client/server architecture. The user of system 100 may access system 100 via client computing device(s) 104. Server(s) 102 may include one or more physical processors 124, and/or other components. The one or more physical processors 124 may be configured by machine-readable instructions 105. Executing machine-readable instructions 105 may cause server(s) 102 to provide the user with persistent virtual entities. Machine-readable instructions 105 may include one or more computer program components. The computer program components may include one or more of a virtual content component 106, a determination component 108, a presentation component 110, an update component 112, and/or other components.

A repository of information defining the virtual content may be available via system 100 and/or server(s) 102. The virtual content may be stored within electronic storage 122, non-transitory storage media, and/or other storage media. The repository of the virtual content may be a data structure configured to store information defining the virtual content. The repository of the virtual content may comprise a computer-readable medium. In some implementations, a data structure configured to store information defining the virtual content may store executable instructions (e.g., programming code) that may be configured to generate views of the virtual content. The data structure configured to store information defining the virtual content may be a single database or multiple databases. In some implementations, different executable instructions stored in the data structure may perform different functions. In some implementations, the virtual content may be a virtual reality content, an augmented reality content, and/or other virtual contents. The virtual content may include one or more virtual entities, and/or other virtual content.

In some implementations, electronic storage 122 may be configured to store virtual content information, virtual content configuration information, virtual content history information associated with a given virtual content, and/or other information. The virtual content information may define one or more virtual entities associated with the given virtual content, a manner of interaction of a virtual entity, visual and/or audio content of the given virtual content, and/or other information of the given virtual content. The virtual content configuration information may define the associations between the given virtual content and a geo-location, the association between the virtual entity and the geo-location, and/or other information. The virtual content history information may define an interaction history between the virtual entity and the user.

In some implementations, client computing device(s) 104 may include one or more of a smartphone, a smartwatch, a tablet computer, a mobile device, a head mounted display, and/or other computing platforms. In some implementations, one or more sensors may be carried by client computing device(s) 104. In some implementations, the one or more sensors may include one or more image sensors, one or more audio sensors, one or more geo-location sensors, one or more orientation sensor, and/or other sensors that may be carried on client computing device(s) 104.

In some implementations, an image sensor of the client computing device(s) 104 may be configured to generate visual output signals conveying visual information within a field of view of the image sensor. The visual information may include one or more images, videos, and/or other visual information. The field of view of the image sensor may be a function of a position and an orientation of a client computing device. In some implementations, the image sensors may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

In some implementations, an audio sensor of the client computing device(s) 104 may be configured to generate audio output signals conveying audio information. The audio information may include audio information from a user and/or audio information around the user (such as ambient audio signal). In some implementations, the audio sensors may comprise one or more microphones, micro-electro-mechanical microphones, and/or other audio sensors.

In some implementations, a geo-location sensor may be configured to generate output signals conveying the geo-location of the sensor, and/or other information. In some implementations, the output signal of the geo-location sensor may convey location information and/or other information. The location information may include one or more real-world locations. In some implementations, a geo-location sensor may comprise one or more of a Global Positioning Systems (GPS), Satellite Navigation Systems (satnav), and/or other positioning systems configured to generate output signals conveying the location of the computing platform, and/or other information. In some implementations, a geo-location sensor may comprise one or more communication sensors configured to interact with remote wireless devices configured to generate output signals conveying the location of the computing platform, and/or other information. By way of non-limiting example, a wireless device may communicate with one or more electromagnetic signals. The one or more electromagnetic signals may include one or more of a Bluetooth signal, Wi-fi, Li-fi, radio signal, and/or other electromagnetic signals. The communication sensors may generate output signals conveying the location of the computing platform by comparing one or more signal strengths between the communication sensor and wireless devices. The one or more comparison of the signal strengths may be used to triangulate the position of the communication sensor relative to the wireless device, and/or other devices.

In some implementations, an orientation sensor may be configured to generate output signals conveying the orientation information. The orientation sensor may include one or more of an accelerometer, gyroscope, Global Positioning Systems (GPS), Satellite Navigation Systems (satnav), and/or other systems for conveying orientation information.

The client computing device(s) 104 may include one or more of one or more processors configured by machine-readable instructions and/or other components. Machine-readable instructions of client computing device(s) 104 may include computer program components. The computer program components may be configured to enable the user associated with the client computing device(s) 104 to interface with system 100, the one or more sensors, and/or external resources 120, and/or provide other functionality attributed herein to client computing device(s) 104 and/or server(s) 102.

In some implementations, virtual content component 106 may be configured to obtain requests for virtual content from client computing device(s) 104 and/or other entities. The requests may include requests to access the virtual content through client computing device(s) 104 and/or other devices. In some implementations, the request for access to virtual content may include a request to access the virtual entity associated with the virtual content. The requests for virtual content from client computing device(s) 104 and/or other entities may be obtained by virtual content component 106 contemporaneously or sequentially.

In some implementations, virtual content component 106 of FIG. 1 may obtain a first request to access a first virtual content, a second virtual content, and/or other virtual content through client computing device(s) 104 from the user. The user may submit the first request to access the first virtual content, the second virtual content, and/or other virtual content at a first location at a first time. The first request to access the first virtual content may include a request to access a first virtual entity, and/or other virtual content. The first request to access the second virtual content may include a request to access a second virtual entity, and/or other virtual content.

In some implementations, virtual content component 106 may obtain a second request to access the first virtual content, the second virtual content, and/or other virtual content through client computing device(s) 104 from the user. The user may submit the second request to access the first virtual content, the second virtual content, and/or other virtual content at a second location at a second time. The second request to access the first virtual content may include a request to access the first virtual entity, and/or other virtual content. The second request to access the second virtual content may include a request to access the second virtual entity, and/or other virtual content.

In some implementations, virtual content component 106 may obtain the first request to access the first virtual content, the second virtual content, and/or other virtual content through more than one client computing device(s) 104 from the user. For example, the first request to access the first virtual content, the second virtual content, and/or other virtual content may be obtained through a first client computing device(s) 104, a second client computing device(s) 104, a third client computing device(s) 104, a fourth client computing device(s) 104, and/or other client computing device(s) 104. The first request to access the first virtual content, the second virtual content, and/or other virtual content through the first client computing device(s), the second client computing device(s), the third client computing device(s) 104, the fourth client computing device(s), and/or other client computing device(s) may be obtained contemporaneously or sequentially.

In some implementations, virtual content component 106 may obtain the first request to access the first virtual content, the second virtual content, and/or other virtual content through one or more user inputs via the client computing device(s) 104 from users. The user input may comprise one or more of a gesture input received through the image sensor and/or other sensors of the client computing device(s) 104, one or more of a voice input received through the audio sensors of the given computing device(s) 104, one or more of a touch input received through a touch-enabled display of the client computing device(s) 104, one or more of a controller input received through game controllers of the client computing device(s) 104 and/or other user inputs.

In some implementations, virtual content component 106 may be configured to obtain client information from client computing device(s) 104. In some implementations, the client information may include one or more of sensor information, user information, client device information, and/or other information from client computer platform(s) 104. In some implementations, the user information may identify a user of client computing device(s) 104. The user information may identify the user of client computing device(s) 104 by one or more of a user account and/or other information associated with the user. The sensor information may be information captured by the one or more sensors associated with client computing device(s) 104. In some implementations, the sensor information may include location information and/or other information captured by the location sensor associated with client computing device(s) 104. In some implementations, the sensor information may include visual information, audio information, and/or other information captured by the one or more sensors of the client computing device(s) 104. The client device information may identify client computing device(s) 104. In some implementations, the client device information may identify the first client computing device, the second client computing device, the third client computing device, the fourth client computing device(s), and/or other client computing device(s) 104 by one or more of a device model, a device serial number, and/or other identifying information related to client computing device(s) 104. In some implementations, the client information may be obtained along with requests for virtual content from client computing device(s) 104.

In some implementations, virtual content component 106 may be configured to obtain third-party information associated with the user of client computing device(s) 104 from external resources 120. In some implementations, external resources 120 may include sources of information, hosts and/or providers of virtual environments outside of system 100, external entities participating with system 100, and/or other resources. In some implementations, some or all of the functionality attributed herein to external resources 120 may be provided by resources included in system 100. In some implementations, external resources 120 may include one or more of a third-party device, third-party servers, and/or other external resources. The third-party information may be obtained contemporaneously or sequentially.

In some implementations, the third-party information may define the user's interaction outside of system 100. By way of non-limiting example, the third-party information may include information associated with one or more of the user's Internet browsing history, HTTP cookie information, purchase history, travel history, internet search history, phone call history, video viewing history, video game platform information, Facebook information, information relating to virtual assistances, and/or other third-party information.

In some implementations, determination component 108 may be configured to determine the virtual content to provide to client computing device(s) 104. In some implementations, determination component 108 may determine to provide client computing device(s) 104 with the virtual content based on the client information received from client computing device(s) 104. In some implementations, determination component 108 may determine to provide client computing device(s) 104 with the virtual content based one or more of the location information, user information, client information, and/or other information. In some implementations, access to specific virtual content including virtual entity may be provided to specific user, specific client computing device(s), and/or other devices.

In some implementations, the virtual content may include the first virtual content, the second virtual content, and/or other virtual content. The virtual entities may include the first virtual entity, and the second virtual entity, and/or other virtual entities. In some implementations, the first virtual entity may be associated with the first virtual content and/or other virtual content. In some implementations, the second virtual entity may be associated with the second virtual content and/or other virtual content.

In some implementations, access to specific virtual content including virtual entity may be provided at specific geo-locations, and/or other locations. In some implementations, the specific virtual content including virtual entity may be associated with specific geo-locations. The geolocation may be a location in the real-world, a location of a device in the real-world, and/or other geolocations. The first virtual content may be associated with the first location. In some implementations, the second virtual content may be associated with the second location.

In some implementations, determination component 108 may determine the virtual content, including the virtual entity provided to the client computing device(s) 140, based on the location information and/or other information of the client computing device(s) 104. In some implementations, responsive to the request for virtual content by the user through client computing platform 104 at the first location, determination component 108 may determine to provide the client computing platform 104 at the first location with the first virtual content including the first virtual entity. In some implementations, responsive to the request for virtual content by the user through client computing platform 104 at the second location, determination component 108 may determine to provide the client computing platform 104 at the second location with the second virtual content including the second virtual entity.

In a non-limiting example, provided that the first virtual content including the first virtual entity may be associated with the first location, determination component 108 may decide to provide client computing device(s) 104 associated with the user access to the first virtual content including the first virtual entity at the first location when the first virtual content including the first virtual entity is requested. Determination component 108 may decide not to provide client computing device(s) 104 associated with the user access to the first virtual content at the second location because the first virtual content including the first virtual entity may not be associated with the second location. In some implementations, if changes are made such that the first virtual content including the first virtual entity may be associated with the second location, determination component 108 may decide to provide client computing device(s) 104 associated with the user access to the first virtual content at the second location.

In a non-limiting example, provided that the second virtual content including the second virtual entity may be associated with the second location, determination component 108 may decide to provide client computing device(s) 104 associated with the user access to the second virtual content including the second virtual entity at the second location when the second virtual content including the second virtual entity is requested. Determination component 108 may decide not to provide client computing device(s) 104 associated with the user access to the second virtual content at the first location because the second virtual content including the second virtual entity may not be associated with the first location. In some implementations, if changes are made such that the second virtual content including the second virtual entity may be associated with the first location, determination component 108 may decide to provide client computing device(s) 104 associated with the user access to the second virtual content at the first location.

In some implementations, the virtual content including the virtual entities associated with the geolocation may be modified. For example, the first virtual content including the first virtual entity may be modified to be associated with the second location and/or other locations. The second virtual content including the second virtual entity may be modified to be associated with the first location and/or other locations. The virtual content including the virtual entities associated with the geolocation may be modified by update component 112. In some implementations, the associations between the given virtual content and the geolocation may be defined by the virtual content configuration information. Modifying the association between the given virtual content and the geolocation may include modifying the virtual content configuration information.

In a non-limiting example, provided that the first virtual content including the first virtual entity may be associated with the second location, determination component 108 may decide to provide client computing device(s) 104 associated with the user access to the first virtual content including the first virtual entity at the second location. Provided that the second virtual content including the second virtual entity may be associated with the first location, determination component 108 may decide to provide client computing device(s) 104 associated with the user access to the second virtual content including the second virtual entity at the first location.

In some implementations, some of the virtual contents including virtual entities may be associated with individual user accounts. The user account may have access to some of the virtual contents including virtual entities. Determination component 108 may decide to provide client computing device(s) 104 associated with the user access to the first virtual content including the first virtual entity and the second virtual content including the second virtual entity based on the user information obtained from client computing device(s) 104. In some implementations, determination component 108 may decide not to provide client computing device(s) 104 associated with the user access to a third virtual content including a third virtual entity based on the user information obtained from client computing device(s) 104. In some implementations, access to the third virtual content including the third virtual entity by the user through client computing device(s) 104 may be purchased through a marketplace by the user.

In some implementations, individual client computing device(s) 104 may have access to some of the virtual contents including virtual entities. Some of the virtual contents including virtual entities may be associated with individual client computing device(s) 104. For example, a first set of virtual contents including virtual entities may be associated with smartphone devices and may be accessed through the smartphone devices, and a second set of virtual contents including virtual entities may be associated with head mounted display devices and may be accessed through the head-mounted display devices. The client device information may identify the different client computing device(s) 104.

In some implementations, determination component 108 may decide to provide different client computing device(s) 104 access to the virtual content including virtual entity based on the client device information obtained from client computing device(s) 104. In some implementations, determination component 108 may decide to provide a first set of client computing device(s) 104 (such as the smartphone devices) access to the first set of virtual contents including virtual entities. In some implementations, determination component 108 may decide to provide a second set of client computing device(s) 104 (such as the head-mounted display devices) access to the second set of virtual contents including virtual entities. In some implementations, access to different sets of virtual content including the virtual entities by the user on different client computing device(s) 104 may be purchased through a marketplace by the user.

In some implementations, presentation component 110 may be configured to facilitate presentation of the virtual content through client computing device(s) 104. Presentation component 110 may facilitate presentation of the virtual content by transmitting information that facilitates the presentation of the virtual content through client computing device(s) 104. In some implementations, the virtual content including the virtual entity, and/or other virtual content may be presented through client computing device(s) 104 via a client interface. In some implementations, the client interface may include an augmented reality interface and/or other interfaces.

In some implementations, the virtual content including the virtual entity may be presented as augmented reality content through client computing device(s) 104 via the augmented reality interface. The augmented reality interface may include views of a real-world environment, views of the virtual content, audio content of the virtual content and/or other contents. In some implementations, the views of the real-world environment may be obtained by the image sensors and/or other sensors. In some implementations, the virtual content and audio content of the virtual content may be defined by the virtual content information. In some implementations, the virtual content may be presented as a two-dimensional visual content, a three-dimensional visual content, and/or other visual content through the augmented reality interface. The visual content of the virtual content may be overlaid on the view of the real-world environment in the augmented reality interface. The visual content of the virtual content may be overlaid on the view of the real-world environment in the augmented reality interface such that the virtual content appears to reside in the real-world environment from the point of view of the user.

In some implementations, the virtual content including the first virtual entity may be presented through the augmented reality interface such that the first virtual entity appears to be in the real-world environment. Views of the first virtual entity may be seen by the user through client computing device(s) 104. In some implementations, views of the first virtual entity may be seen by the user through multiple client computing device(s) 104. A view of the first virtual entity may be overlaid on the view of the real-world environment at the first location in the augmented reality interface such that the first virtual entity appears to reside in the real-world environment from the point of view of the user.

In some implementations, the virtual content including the second virtual entity may be presented through the augmented reality interface such that the second virtual entity appears to be in the real-world environment. Views of the second virtual entity may be seen by the user through client computing device(s) 104. In some implementations, views of the second virtual entity may be seen by the user through multiple client computing device(s) 104. A view of the second virtual entity may be overlaid on the view of the real-world environment at the second location in the augmented reality interface such that the second virtual entity appears to reside in the real-world environment from the point of view of the user.

In some implementations, the virtual content may be configured to be positioned at a predetermined location, area, and/or other reference points in the real-world environment. In some implementations, presentation component 110 may be configured to determine the size, position, and/or other features of the visual content defining the virtual content presented in the augmented reality interface. The size, position, and/or other features of the visual content of the virtual content presented in the augmented reality interface may be based on the predetermined location, area, and/or other reference points to position the virtual content. For example, a first virtual entity may be positioned at a location around a first building and/or other reference points. The size, position, and/or other features of the visual content of the first virtual content presented in the augmented reality interface may depend on the user's position relative to the first building and/or other reference points. A second virtual entity may be positioned at a second location around a second building and/or other reference points. The size, position, and/or other features of the visual content of the second virtual content presented in the augmented reality interface may depend on the user's position relative to the second building and/or other reference points.

In some implementations, presentation component 110 may determine the user's position relative to the first building, the second building, and/or other reference points based on visual information obtained by the image sensor, orientation information obtained by the orientation sensor, and/or other information. In some implementations, presentation component 110 may determine the distance between the client computing device(s) 104 and the first building, the second building, and/or other reference points based on the visual information obtained by the image sensor. In some implementations, the presentation component 110 may determine the orientation of the client computing device(s) 104 relative to the first building, the second building, and/or other reference points. In some implementations, presentation component 110 may determine the user's position relative to the first building, the second building, and/or other reference points based location information obtained by the geo-location sensor.

In some implementations, presentation component 110 may be configured to facilitate interactions between the virtual entity and the user. In some implementations, presentation component 110 may facilitate interactions between the virtual entity and the user through client computing device(s) 104. In some implementations, the virtual entity may communicate with the user through client computing device(s) 104 via the client interface. The user may communicate with the virtual entity by inputting the user input through client computing device(s) 104. In some implementations, presentation component 110 may facilitate one or more of a response, reaction, communication, and/or other interactions from the virtual entity based on the user input.

In a non-limiting example, the user may greet the first virtual entity by saying "hello" through the client computing device(s) 104. In response to the user saying "hello," the first virtual entity may respond to the user by saying "Hi user 212, how are you?" through the client interface. In some implementations, the user may ask the first virtual entity a question and/or make a comment through client computing device(s) 104. In response to the user's question and/or comment, the first virtual entity may respond with an answer to the question, a question to the comment, and/or other responses. In some implementations, the first virtual entity may respond to user with one or more gestures, expression, and/or other visual based communication through the client interface.

In some implementations, presentation component 110 may facilitate the virtual entity's interaction with the user based on the virtual content information, virtual content history information, third-party information, and/or other information. In some implementations, presentation component 110 may facilitate one or more of a response, reaction, communication, and/or other interactions from the virtual entity to user based on the virtual content information, virtual content history information, third-party information, and/or other information.

In some implementation, the virtual content history information may include information about user interactions with the first virtual entity. Responsive to presentation component 110 receiving the virtual content history information, the first virtual entity may base their interaction with the user on the virtual content history information. The interaction may be a conversation, a presentation, a response to the user, and/or other interactions. For example, the virtual content history information may include information relating to a conversation the user made with first entity. Responsive to presentation component 110 obtaining the virtual content history information, first entity may follow up with the user about their last conversation. In some implementations, the virtual content history information may include information about user's conversation with the second virtual entity. Responsive to presentation component 110 receiving the virtual content history information, the first virtual entity may follow up with user about their conversation with the second virtual entity.

In some implementation, the third-party information may include information about the user's interaction outside of system 100, for example, the user's online purchases and/or other interaction outside of system 100. Responsive to presentation component 110 receiving the third-party information, the first virtual entity may base their interaction with the user on the third-party information. For example, the first virtual entity may ask the user about their online purchases and/or other questions or make other comments based on the third-party information.

In some implementations, the virtual content information may define the virtual entity's manner of interaction with the user. In some implementation, the manner of interaction of the virtual entity may define the virtual entity's behavior toward the user. In some implementations, the virtual content information may be based on the virtual content history information, the third-party information, and/or other information. For example, based on the virtual content information, the first virtual entity may be friendly and helpful toward the user. Alternatively, based on the virtual content information, the first virtual entity may be impatient and nonhelpful toward the user. In some implementation, the manner of interaction of the virtual entity may be based on the virtual content history information, the third-party information, and/or other information.

In some implementations, presentation component 110 may facilitate the presentation of the virtual content including the virtual entity through one or more client computing device(s) 104 associated with the user. In some implementations, the presentation component 110 may facilitate the presentation of the virtual content including the virtual entity through one or more client computing device(s) 104 associated with the user contemporaneously or sequentially. For example, the first client computing device(s) 104, the second client computing device(s) 104, the third client computing device(s) 104, the fourth client computing device(s) 104, and/or other client computing device(s) 104 may be associated with the user. Presentation component 110 may present the virtual content including the virtual entity through the first client computing device(s) 104, the second client computing device(s) 104, the third client computing device(s) 104, the fourth client computing device(s) 104, and/or other client computing device(s) 104 that may be associated with the user. In some implementations, presentation component 110 may present the virtual content including the virtual entity through the first client computing device(s) 104, the second client computing device(s) 104, the third client computing device(s) 104, the fourth client computing device(s) 104, and/or other client computing device(s) 104 that may be associated with the user contemporaneously or at non-overlapping times.

In some implementations, presentation component 110 may facilitate interaction between the virtual entity and the user through the first client computing device(s) 104, the second client computing device(s) 104, the third client computing device(s) 104, the fourth client computing device(s) 104, and/or other client computing device(s) 104 that may be associated with the user. The virtual entity may interact with the user based on the virtual content information, virtual content history information, third-party information, and/or other information through the client computing device(s) 104 as described above. In some implementations, presentation component 110 may facilitate interaction between the virtual entity and the user through the first client computing device(s) 104, the second client computing device(s) 104, the third client computing device(s) 104, the fourth client computing device(s) 104, and/or other client computing device(s) 104 that may be associated with the user contemporaneously or at non-overlapping times.

In some implementations, presentation component 110 may facilitate the presentation of the first virtual entity through the first client computing device(s) 104, the second client computing device(s) 104, the third client computing device(s) 104, the fourth client computing device(s) 104, and/or other client computing device(s) 104 that may be associated with the user contemporaneously or at non-overlapping times. The user may interact with the first virtual entity through the first client computing device(s) 104, the second client computing device(s) 104, the third client computing device(s) 104, the fourth client computing device(s) 104, and/or other client computing device(s) 104 that may be associated with the user contemporaneously or at non-overlapping times.

In some implementations, presentation component 110 may facilitate interaction between the virtual entity and the user through the first client computing device(s) 104, the second client computing device(s) 104, the third client computing device(s) 104, the fourth client computing device(s) 104, and/or other client computing device(s) 104 that may be associated with the user contemporaneously or at non-overlapping times.

In some implementations, presentation component 110 may facilitate the presentation of the first virtual entity through the first client computing device(s) 104, the second client computing device(s) 104, the third client computing device(s) 104, the fourth client computing device(s) 104, and/or other client computing device(s) 104 that may be associated with the user contemporaneously or at non-overlapping times. The user may interact with the first virtual entity through the first client computing device(s) 104, the second client computing device(s) 104, the third client computing device(s) 104, the fourth client computing device(s) 104, or other client computing device(s) 104 that may be associated with the user contemporaneously or at non-overlapping times.

In some implementations, update component 112 may be configured to manage the virtual content information, virtual content configuration information, virtual content history information, and/or other information. Update component 112 may update and/or modify the virtual content information, virtual content configuration information, virtual content history information, and/or other information based on the user's interaction with the virtual entity, the third-party information, and/or other information.

In some implementations, based on the user's interaction with the virtual entity 212, update component 112 may be configured to update and/or modify the virtual content history information. For example, update component 112 may receive information relating to the user's interaction with the first virtual entity. Responsive to update component 112 receiving information relating to the user's interaction with the first virtual entity, update component 112 may modify and/or update the virtual content history information to include information about the user's interaction with the first virtual entity. In some implementations, the first virtual entity may interact with the user based on the updated virtual content history information.

In some implementations, update component 112 may be configured to modify and/or update the virtual content information based on the third-party information, updated virtual content history information, and/or other information. For example, the manner of behavior of the first virtual entity toward user may be based on the third-party information, virtual content history information, and/or other information. Responsive to the reception of the third-party information, the updated virtual content history information, and/or other information, the manner of behavior of the first virtual entity toward user may change. Update component 112 may modify and/or update the virtual content information based on the third-party information, the changes in virtual content history information, and/or other information such that the manner of behavior of the first virtual entity toward user may be based on the updated virtual history information, and/or other information.

In some implementations, update component 112 may update and/or modify the visual and/or audio content of the virtual content including the virtual entity by updating and/or modifying the virtual content information. In some implementations, update component 112 may update and/or modify the visual and/or audio content of the virtual content including the virtual entity by updating and/or modifying the virtual content information based on the third-party information, updated virtual content history information, and/or other information. For example, based on the third-party information, updated virtual content history information, and/or other information, update component 112 may change the visual appearance and/or audio content of the first virtual entity 212.

In some implementations, update component 112 may update and/or modify the association between the virtual content including the virtual entity and the real-world location by modifying the virtual content configuration information. In some implementations, update component 112 may update and/or modify the association between the virtual content and the real-world location by modifying the virtual content configuration information based on the third-party information, updated virtual content history information, and/or other information.

For example, based on the third-party information, updated virtual content history information, and/or other information, update component 112 may update and/or modify the association between the first virtual entity and the real-world location such that the first virtual entity may be associated with other locations aside from the first location. The updated and/or modified association between the first virtual entity and the real-world location may change where the determination components 108 decide the first virtual entity may be accessible. For example, based on the updated third-party information, updated virtual content history information, and/or other information, update component 112 may update and/or modify the association between the first virtual entity and the real-world location such that the first virtual entity may be associated with other reference points aside from the first building. The updated and/or modified association between the first virtual entity and the real-world location may change where and/or how between the first virtual entity is presented to client computing device(s) 104 by presentation component 110.

In some implementations, server(s) 102, client device(s) 104, and/or external resources 120 may be operatively linked via one or more electronic communication links. For example, such electronic communication links may be established, at least in part, via the network 103 such as the Internet and/or other networks. It will be appreciated that this is not intended to be limiting, and that the scope of this disclosure includes implementations in which server(s) 102, client device(s) 104, and/or external resources 120 may be operatively linked via some other communication media.

In some implementations, external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

In some implementations, Server(s) 102 may include electronic storage 122, one or more processors 124, and/or other components. Server(s) 102 may include communication lines or ports to enable the exchange of information with a network and/or other computing devices. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage 122 may include electronic storage media that electronically stores information. The electronic storage media of electronic storage 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing device(s) 104, and/or other information that enables server(s) 102 to function as described herein.

In some implementations, Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same client computing device, or processor(s) 124 may represent processing functionality of a plurality of devices operating in coordination. The processor(s) 124 may be configured to execute computer-readable instruction components 106, 108, 110, 112, and/or other components. The processor(s) 124 may be configured to execute components 106, 108, 110, 112, and/or other components by software; hardware; firmware; some combination of software, hardware, and/or firmware; and/or other mechanisms for configuring processing capabilities on processor(s) 124.

It should be appreciated that although components 106, 108, 110, and 112 are illustrated in FIG. 1 as being co-located within a single processing unit, in implementations in which processor(s) 124 includes multiple processing units, one or more of components 106, 108, 110, and/or 112 may be located remotely from the other components. The description of the functionality provided by the different components 106, 108, 110, and/or 112 described herein is for illustrative purposes, and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, processor(s) 124 may be configured to execute one or more additional components that may perform some or all of the functionality attributed herein to one of components 106, 108, 110, and/or 112.

Figure 2:
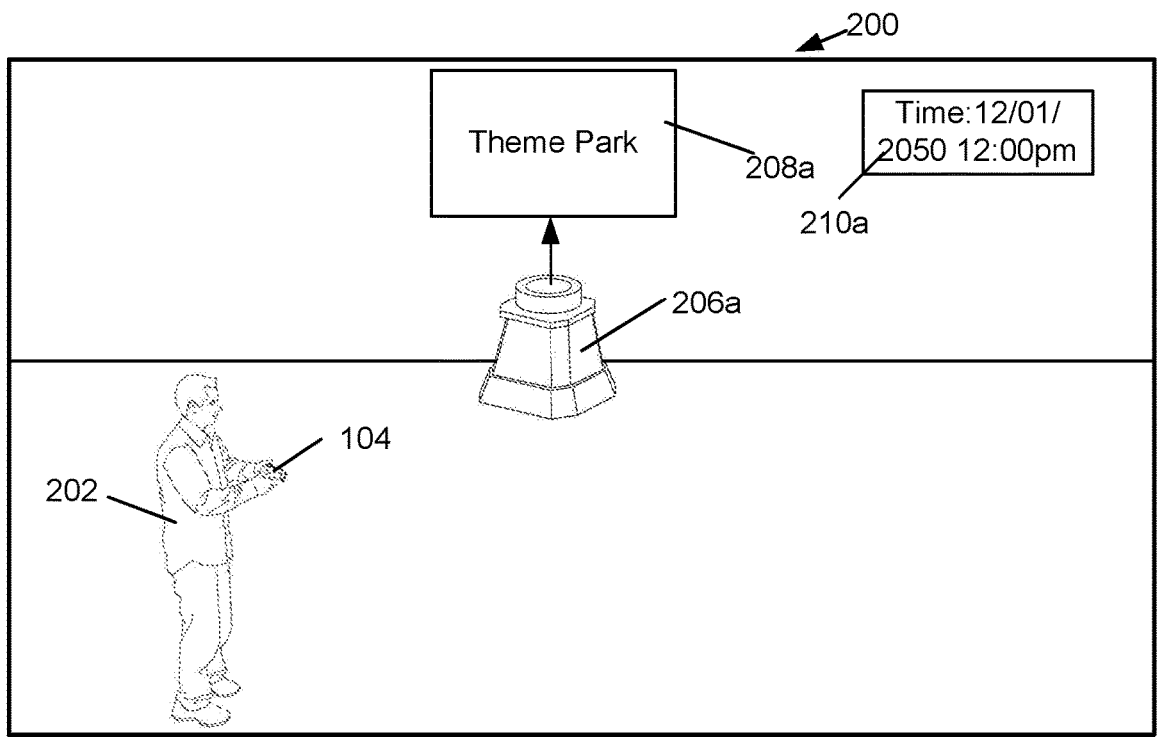
FIG. 2 illustrates a user at a first location requesting access to a first virtual content, in accordance with one or more implementations.

As illustrated in FIG. 2, user 202 may submit a first request to access a first virtual content, a second virtual content, and/or other virtual content at a first location 208a at a first time 210a. In some implementations, the first request may be submitted to system 100 through the client computing device(s) 104.

In some implementations, the first request to access the first virtual content may include a request to access a first virtual entity 212 (illustrated in FIG. 3) and/or other virtual content. First virtual entity 212 may be associated with first location 208a. In some implementations, the first request to access the second virtual content may include a request to access a second virtual entity 214, (illustrated in FIG. 5) and/or other virtual content. Second virtual entity 214 may be associated with second location 208b.

Figure 3:
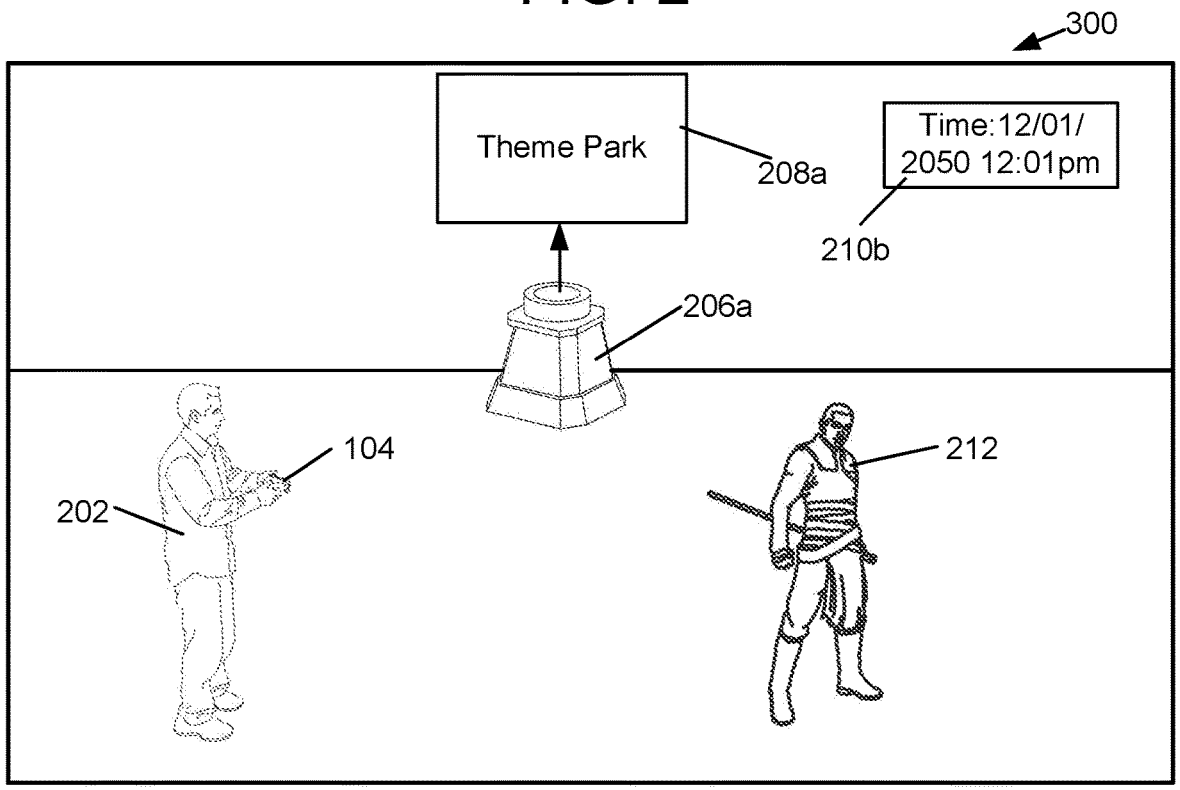
FIG. 3 illustrates an augmented reality where the user at the first location is interacting with the first virtual content, in accordance with one or more implementations.

Referring to FIG. 3, in some implementations, responsive to user 202 submitting the first request at the first location 208, system 100 may determine to provide the client computing platform 104 at first location 208a with the first virtual content including the first virtual entity 212.

In a non-limiting example, provided that the first virtual content including first virtual entity 212 may be associated with the first location 208a, system 100 may provide client computing device(s) 104 associated with user 202 access to the first virtual content including first virtual entity 212 at first location 208a. System 100 may decide not to provide client computing device(s) 104 associated with user 202 with access to the first virtual content at second location 208b because the first virtual content including first virtual entity 212 may not be associated with second location 208b.

In some implementations, the first virtual content including first virtual entity 212 may be presented through a client interface of the client computing device(s) 104. The client interface may include an augmented reality interface. The augmented reality interface may be configured to present the first virtual content through augmented reality.

In some implementations, the augmented reality interface may include views of a real-world environment, views of the virtual content, audio content of the virtual content and/or other contents. In some implementations, the views of the real-world environment may be obtained by the image sensors and/or other sensors of client computing device(s) 104.

In some implementations, visual content of the first virtual content including first virtual entity 212 may be overlaid on the view of the real-world environment in the augmented reality interface. The visual content of the first virtual content including first virtual entity 212 may be overlaid on the view of the real-world environment in the augmented reality interface such that the first virtual content including first virtual entity 212 appears to reside in the real-world environment from the point of view of user 202.

In some implementations, user 202 may interact with first virtual entity 212. User 202 may interact with first virtual entity 212 through client computing device(s) 104. User 202 may interact with first virtual entity 212 through client computing device(s) 104 via user inputs. In some implementations, first virtual entity 212's manner of behavior toward user 202 and/or interaction with user 202 may be determined by system 100.

Figure 4:
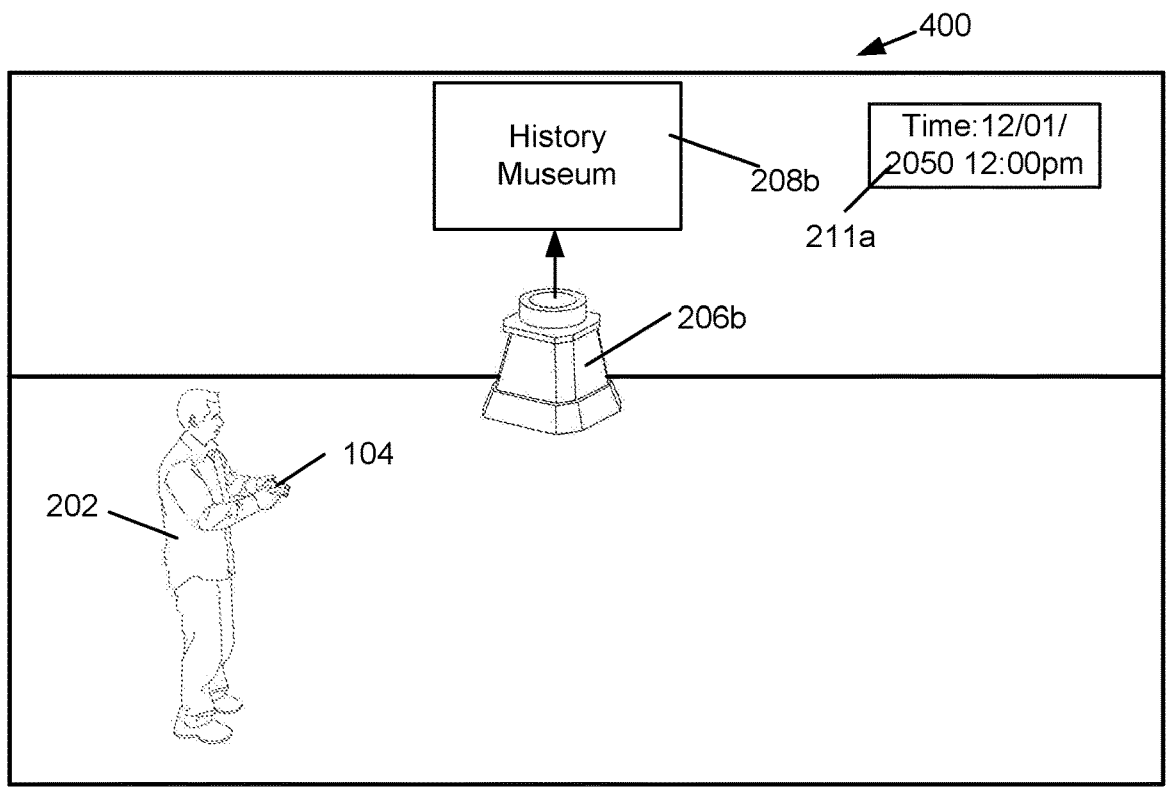
FIG. 4 illustrates the user at a second location requesting access to a second virtual content, in accordance with one or more implementations.

As illustrated in FIG. 4, user 202 may submit a second request to access the first virtual content, the second virtual content, and/or other virtual content at a second location 208a at a second time 211a. In some implementations, the second request may be submitted to system 100 through the client computing device(s) 104. The second request to access the first virtual content may include request to access the first virtual entity 212 (illustrated in FIG. 3), and/or other virtual content. The second request to access the second virtual content may include request to access the second virtual entity 214 (illustrated in FIG. 5), and/or other virtual content.

Figure 5:
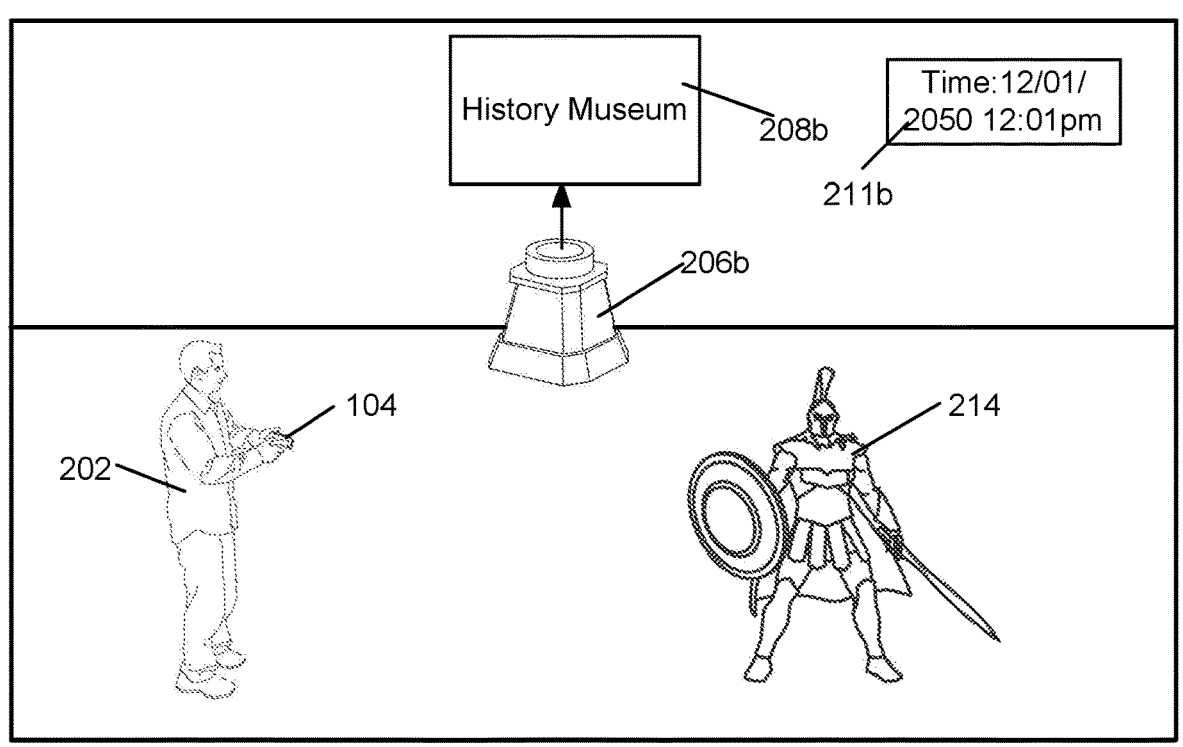
FIG. 5 illustrates an augmented reality where the user at the second location is interacting with the second virtual content, in accordance with one or more implementations.

Referring to FIG. 5, in some implementations, responsive to user 202 submitting the second request at second location 208b, system 100 may determine to provide the client computing platform 104 at second location 208b with the second virtual content including the second virtual entity 214.

In a non-limiting example, provided that the second virtual content including second virtual entity 214 may be associated with the second location 208b, system 100 may decide to provide client computing device(s) 104 associated with user 202 access to the second virtual content including second virtual entity 214 at second location 208b when the second virtual content including second virtual entity 214 is requested. System 100 may decide not to provide client computing device(s) 104 associated with user 202 access to the second virtual content at first location 208a because the second virtual content including second virtual entity 214 may not be associated with first location 208a.

In some implementations, the second virtual content including second virtual entity 214 may be presented through the client interface of the client computing device(s) 104. The client interface may include the augmented reality interface. The augmented reality interface may be configured to present the second virtual content through augmented reality.

In some implementations, visual content of the second virtual content including second virtual entity 214 may be overlaid on the view of the real-world environment in the augmented reality interface. The visual content of second virtual content including second virtual entity 214 may be overlaid on the view of the real-world environment in the augmented reality interface such that the second virtual content including second virtual entity 214 appears to reside in the real-world environment from the point of view of user 202.

In some implementations, user 202 may interact with second virtual entity 214. User 202 may interact with second virtual entity 214 through client computing device(s) 104. User 202 may interact with second virtual entity 214 through client computing device(s) 104 via user inputs. In some implementations, second virtual entity 214's manner of behavior toward user 202 and/or interaction with user 202 may be determined by system 100.

Figure 6:
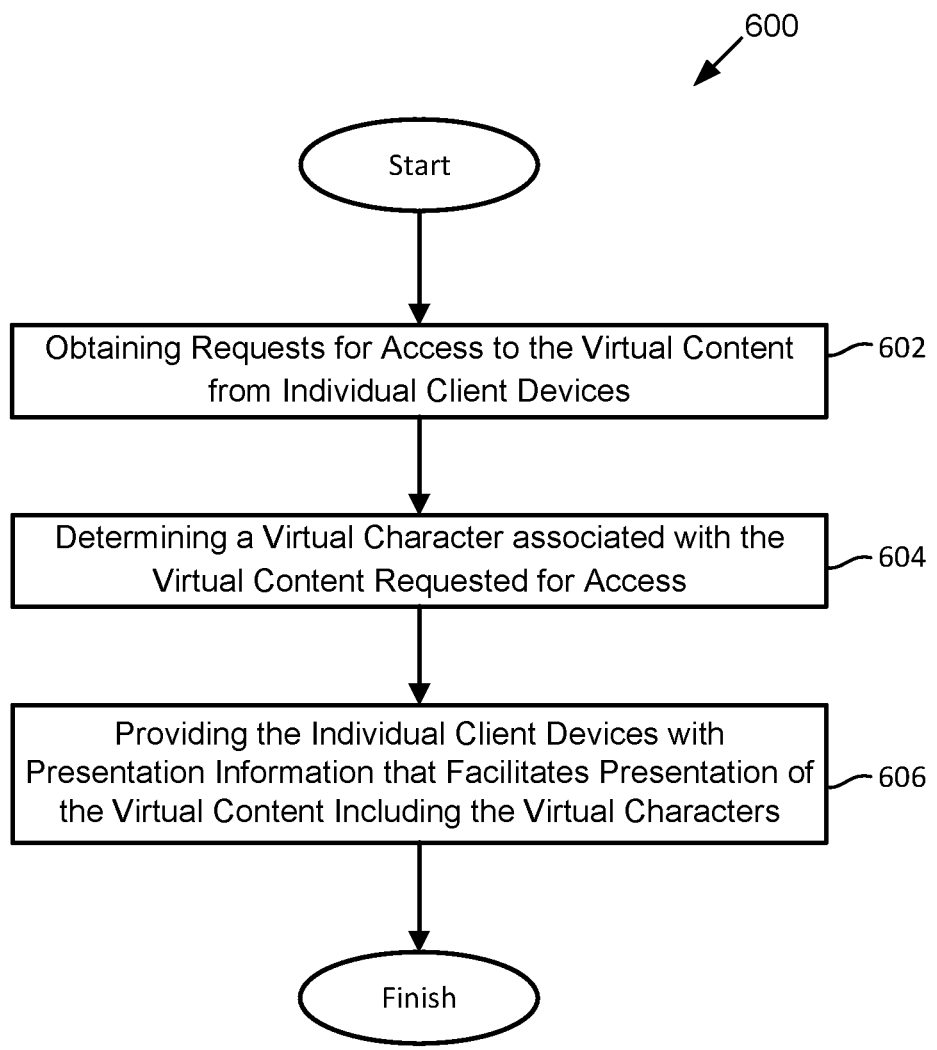
FIG. 6 illustrates a method to provide a user with an artificial intelligence experience, in accordance with one or more implementations.

FIG. 6 illustrates the method 600, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below are not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, requests for access to the virtual content from individual client devices may be obtained, wherein the request includes a first request for access to first virtual content from a first client device, and a second request for access to the first virtual content from a second client device, the first client device being separate and distinct from the second client device. In some embodiments, operation 602 is performed by a virtual content component the same as or similar to virtual content component 106 (shown in FIG. 1 and described herein).

At an operation 604, a virtual entity associated with the virtual content requested for access may be determined. A first virtual entity is associated with the first virtual content and a second virtual entity is associated with second virtual content. In some embodiments, operation 604 is performed by a determination component the same as or similar to determination component 108 (shown in FIG. 1 and described herein).

At an operation 606, the individual client devices may be provided with presentation information that facilitates presentation of the virtual content including the virtual entities, such that the first client device is provided with information that facilitates presentation of the first virtual content including the first virtual entity and the second client device is provided with information that facilitates presentation of the first virtual content including the first virtual entity. In some embodiments, operation 606 is performed by a presentation component the same as or similar to presentation component 110 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to facilitate interaction with artificial intelligence (AI) virtual characters, the system comprising:

a non-transitory storage medium configured to store virtual content information, the virtual content information defining virtual content, the virtual content including one or more AI virtual characters; and one or more physical processors configured by machine-readable instructions to:

obtain requests for access to the virtual content from individual client devices, wherein the requests include a first request from a first client device for access to first virtual content, and a second request from a second client device for access to the first virtual content, the first client device being separate and distinct from the second client device, the second request being obtained after the first request;

determine individual AI virtual characters of the virtual content requested for access, such that a first AI virtual character of the first virtual content is determined, and wherein the first AI virtual character is configured to provide an audio communication to one or more users interacting with the first AI virtual character;

responsive to the determination of the individual AI virtual characters, provide the individual client devices with presentation information that facilitates presentation of the virtual content including the individual AI virtual characters, such that the first client device is provided with first presentation information that facilitates presentation via the first client device of the first virtual content including the first AI virtual character;

facilitate user interaction with the individual AI virtual characters through the individual client devices, such that a first user interaction with the first AI virtual character is facilitated via the first client device;

obtain device monitoring information for the individual client devices characterizing use of the individual client devices with a plurality of resources external to the system, the device monitoring information defining two or more of an Internet browsing and search history, a phone call history, or a video viewing history, such that first device monitoring information for the first client device is obtained;

update the virtual content information based on the user interaction with the individual AI virtual characters and the device monitoring information, such that the virtual content information defining the first virtual content including the first AI virtual character is updated based on the first user interaction and the first device monitoring information; and provide the second client device with second presentation information that facilitates presentation via the second client device of the first virtual content including the first AI virtual character, wherein the updating the virtual content information defining the first virtual content including the first AI virtual character based on the first user interaction and the first device monitoring information causes the first AI virtual character as presented via the second client device to base the audio communication on the first user interaction and the first device monitoring information such that the audio communication refers directly to the first user interaction and the first device monitoring information.

2. The system of claim 1, wherein the one or more physical processors are further configured by machine-readable instructions to facilitate a second user interaction with the first AI virtual character via the second client device, and wherein the first user interaction and the second user interaction are contemporaneous in time.

3. The system of claim 1, wherein the one or more physical processors are further configured by machine-readable instructions to monitor the individual client devices to determine the device monitoring information.

4. The system of claim 1, wherein the one or more physical processors are further configured by machine-readable instructions to further update the virtual content information based on user interaction with a real-world environment.

5. The system of claim 1, wherein the first client device or the second client device have access to the first virtual content including the first AI virtual character at a specific time, at a specific geolocation, or a combination thereof.

6. The system of claim 1, wherein the virtual content information further defines a manner of interaction of the individual AI virtual characters with the one or more users.

7. The system of claim 6, wherein the manner of interaction defines communicative behavior of the individual AI virtual characters with the one or more users.

8. The system of claim 1, wherein the individual AI virtual characters are presented to the individual client devices through a client interface, wherein views of the client interface include visual content of a real-world environment, and the individual AI virtual characters are positioned relative to the visual content of the real-world environment such that the individual AI virtual characters are perceived as being present in the real-world environment.

9. The system of claim 1, wherein the first client device is a smartphone and the second client device is a head-mounted display.

10. The system of claim 1, wherein the one or more physical processors are further configured by machine-readable instructions to facilitate a second user interaction with the first AI virtual character via the second client device, and wherein the first user interaction and the second user interaction are sequential and non-overlapping in time.

11. A method to interact with artificial intelligence (AI) virtual characters, the method being implemented in a computer system comprising one or more physical processors and a storage medium storing machine-readable instructions, the method comprising:
    obtaining virtual content information, the virtual content information defining virtual content, the virtual content including one or more AI virtual characters;
    obtaining requests for access to the virtual content from individual client devices, wherein the requests include a first request from a first client device for access to first virtual content, and a second request from a second client device for access to the first virtual content, the first client device being separate and distinct from the second client device, the second request being obtained after the first request;
    determining individual AI virtual characters of the virtual content requested for access, including determining a first AI virtual character of the first virtual content, and wherein the first AI virtual character is configured to provide an audio communication to one or more users interacting with the first AI virtual character;
    responsive to the determination of the individual AI virtual characters associated with the virtual content included in the requests, providing the individual client devices with presentation information that facilitates presentation of the virtual content including the individual AI virtual characters, including providing the first client device with first presentation information that facilitates presentation via the first client device of the first virtual content including the first AI virtual character;
    facilitating user interaction with the individual AI virtual characters through the individual client devices, including facilitating a first user interaction with the first AI virtual character via the first client device;
    obtaining device monitoring information for the individual client devices characterizing use of the individual client devices with a plurality of resources external to the computer system, the device monitoring information defining two or more of an Internet browsing and search history, a phone call history, or a video viewing history, including obtaining first device monitoring information for the first client device;
    updating the virtual content information based on the user interaction with the individual AI virtual characters and the device monitoring information, including updating the virtual content information defining the first virtual content including the first AI virtual character based on the first user interaction and the first device monitoring information; and
    providing the second client device with second presentation information that facilitates presentation via the second client device of the first virtual content including the first AI virtual character, wherein the updating the virtual content information defining the first virtual content including the first AI virtual character based on the first user interaction and the first device monitoring information causes the first AI virtual character as presented via the second client device to base the audio communication on the first user interaction and the first device monitoring information such that the audio communication refers directly to the first user interaction and the first device monitoring information.

12. The method of claim 11, further comprising facilitating a second user interaction with the first AI virtual character via the second client device, and wherein the first user interaction and the second user interaction are contemporaneous in time.

13. The method of claim 11, wherein the method includes monitoring the individual client devices to determine the device monitoring information.

14. The method of claim 11, further comprising further updating the virtual content information based on user interaction with a real-world environment.

15. The method of claim 11, wherein the first client device or the second client device have access to the first virtual content including the first AI virtual character at a specific time, at a specific geolocation, or a combination thereof.

16. The method of claim 11, wherein the virtual content information further defines a manner of interaction of the individual AI virtual characters with the one or more users.

17. The method of claim 16, wherein the manner of interaction defines communicative behavior of the individual AI virtual characters with the one or more users.

18. The method of claim 11, wherein the individual AI virtual characters are presented to the individual client devices through a client interface, wherein views of the client interface include visual content of a real-world environment and the individual AI virtual characters are positioned relative to the visual content of the real-world environment such that the individual AI virtual characters are perceived as being present in the real-world environment.

19. The method of claim 11, wherein the first client device is a smartphone and the second client device is a head-mounted display.

20. The method of claim 11, further comprising facilitating a second user interaction with the first AI virtual character via the second client device, and wherein the first user interaction and the second user interaction are sequential and non-overlapping in time.

* * * * *